W. E. WINSHIP.
ELECTRICAL SYSTEM OF DISTRIBUTION.
APPLICATION FILED MAR. 11, 1905.
941,690.
Patented Nov. 30, 1909.
2 SHEETS—SHEET 1.
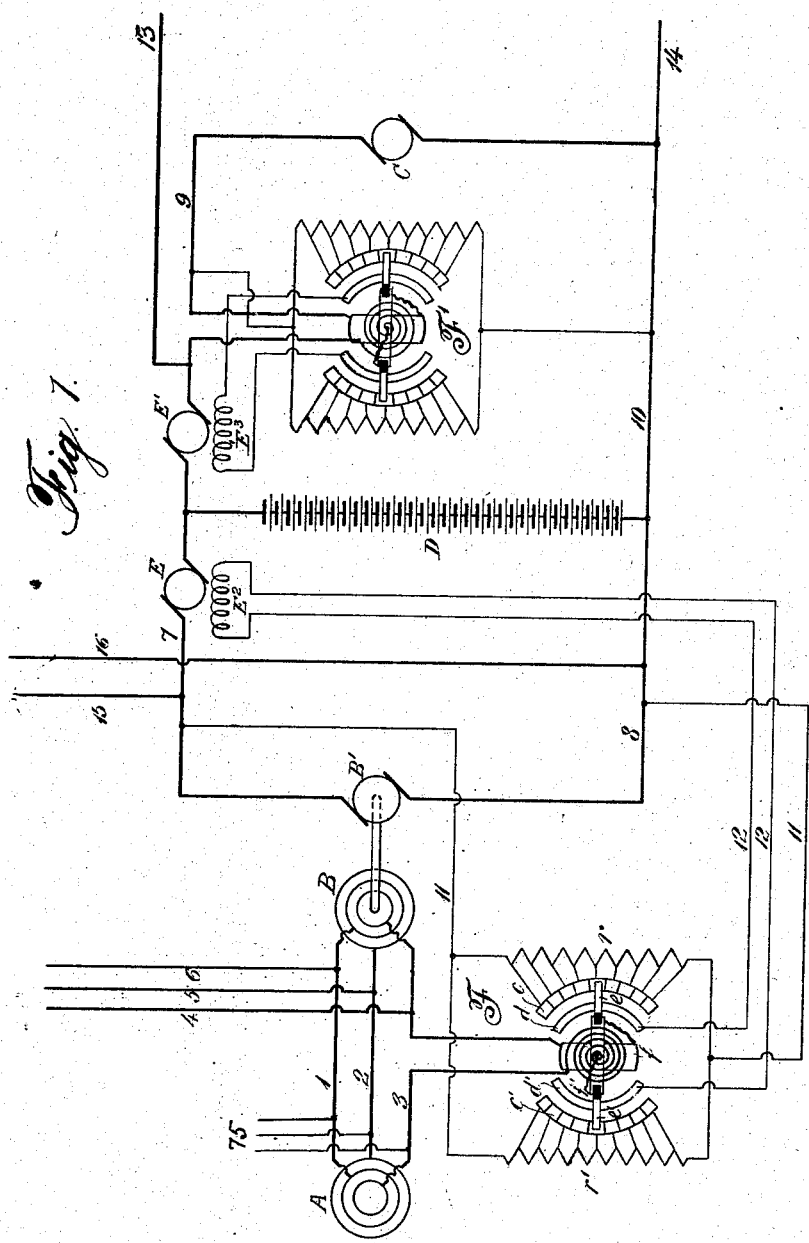

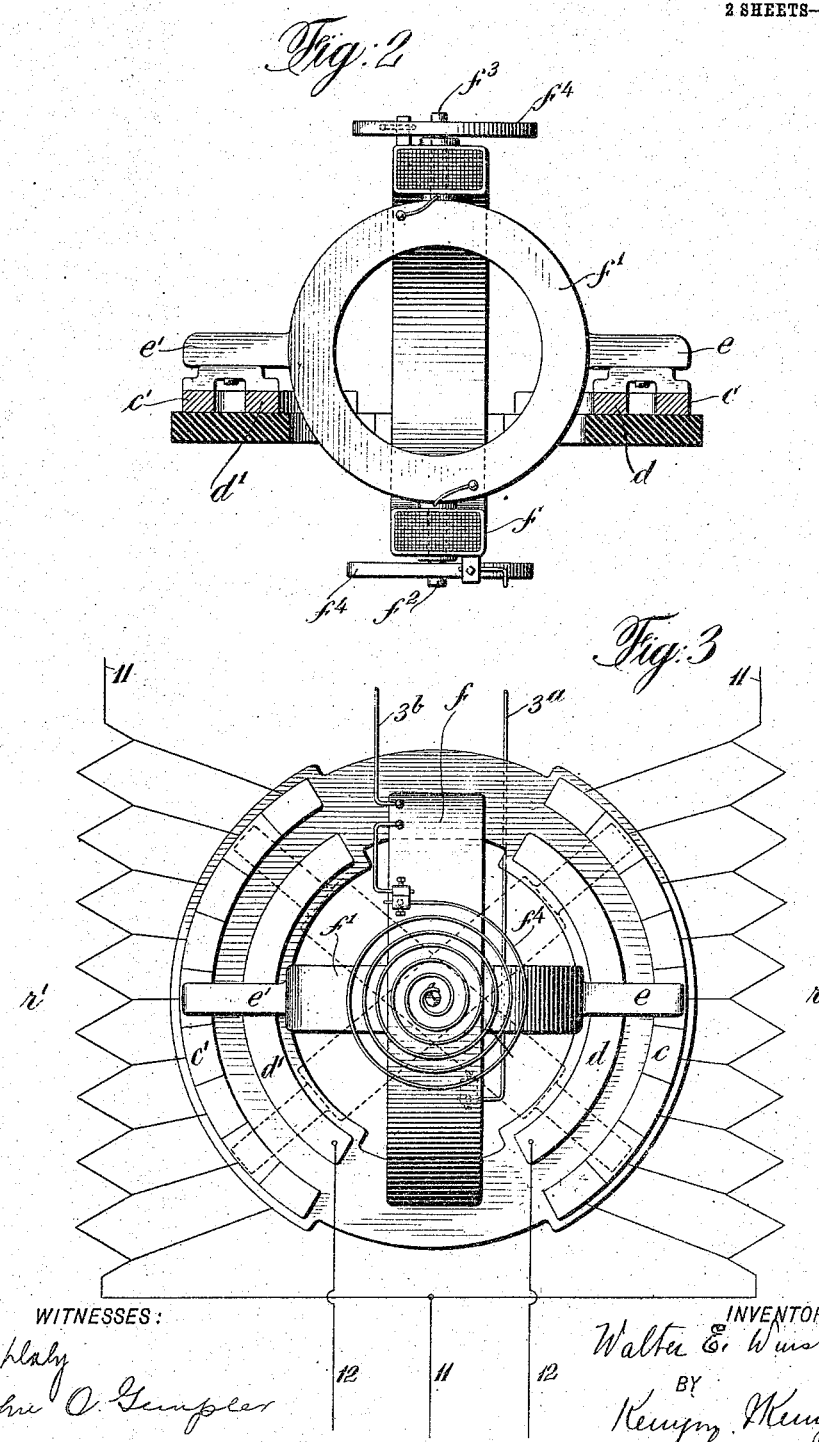

UNITED STATES PATENT OFFICE.

WALTER E. WINSHIP, OF NEW YORK, N. Y., ASSIGNOR TO GOULD STORAGE BATTERY COMPANY, A CORPORATION OF NEW YORK.

ELECTRICAL SYSTEM OF DISTRIBUTION.

941,690.

Specification of Letters Patent. Patented Nov. 30, 1909.

Application filed March 11, 1905. Serial No. 249,534.

*To all whom it may concern:*

Be it known that I, WALTER E. WINSHIP, a citizen of the United States, and resident of New York city, county and State of New York, have invented certain new and useful Improvements in Electrical Systems of Distribution, of which the following is a specification.

My invention relates to electrical systems of distribution.

Generally speaking its object is to provide a system in which the load on the generators may be kept constant within desired limits despite fluctuations of load on the working circuit and variations of other kinds in circuit conditions.

My invention is particularly applicable to systems in which different types of generators are employed feeding different types of working circuits, especially systems in which there are both A. C. and D. C. circuits, with a rotary converter or other suitable rectifying apparatus between the two systems. In fact certain features of my invention are specifically directed to improvements in systems of this character, whereby the effects of sudden changes in one circuit are softened by quickly responding compensating changes in both circuits; other features may be advantageously employed in systems of different character.

The more specific objects of my invention, together with the means by which they are obtained, can better be explained in connection with the specific system hereinafter described.

Referring to the drawings, Figure 1 diagrammatically illustrates a specific system embodying the various features of my invention. Figs. 2 and 3 are details showing a form of dynamometer that may be used as the regulating device for affecting the battery condition.

A is an alternating current generator, here shown as a three phase generator, 1, 2 and 3 being the leads therefrom.

4, 5 and 6 represent leads to an alternating current working circuit.

B B' represents a rectifying device, in this case a motor-generator, the end B being an alternating current machine and the end B' being a direct current machine. It is to be understood that it is not essential to my invention that the rectifying device B B' be a motor-generator, but to obtain the full advantages of my improved system it should be capable of use in either direction, *i. e.*, either to receive an alternating current and give out a direct current or receive a direct current and give out an alternating current, or, speaking more broadly, to receive a current of one kind or at one pressure and give out a current of another kind or at another pressure.

7 and 8 are direct current leads connected to B', and connected across these leads is an equalizing circuit containing the storage batteries D. Between the rectifying device and the storage batteries is the booster E, preferably a dynamo armature. The controlling coil $E^2$ of this booster, in this case a field coil for the booster, is connected to the regulating device F which is acted upon by current from the alternating current side of the system so as to be affected by changes in the electrical condition of the alternating current circuit. The essential point about this regulating device is that it shall be so connected and constructed that it will be affected by changes of electrical condition in the alternating circuit while it in turn shall control the battery current, in the case shown by regulating the voltage of booster E, so that the battery may effectively act as an equalizer of the load on the generator A. I consider it preferable that this regulating device shall be acted upon directly by the fluctuations of current in the circuit between generator A and conductors 4, 5, 6 so that it shall regulate in accordance with the load on that generator.

The particular regulating device F shown is a dynamometer having its fixed and movable coils $f$ and $f'$ connected in series in the conductor 3 between the generator A and the conductor 4 of the alternating current work circuit.

$r$ and $r'$ are resistances connected in parallel in a circuit 11 across conductors 7, 8. These resistances are connected at a number of points to the insulated sections of the segments $c$ and $c'$ respectively.

$d$ and $d'$ are continuous segments connected by conductors 12, 12 with opposite ends of field winding $E^2$. Moving with coil $f'$ of the dynamometer are contacts $e$ and $e'$ which are in contact throughout their movement with segments $d$ and $d'$ respectively and also with segments $c$ and $c'$ respectively and connect the sections of the latter with the segments $d$ and $d'$ and through them with the opposite ends of field-coil $E^2$.

When the coil $f'$ is in the position shown no current is directed through coil $E^2$. As the moving coil of the dynamometer, affected by increase or decrease of current on generator A, moves in one direction or the other, a current is directed through winding $E^2$. The direction and intensity of this current, and consequently the direction and value of the E. M. F. generated by booster E and the direction and amount of current in the battery, is dependent upon the direction and extent of movement of the dynamometer. Thus any change of load on generator A from that which may be considered its average load, to whatever cause said change may be due at once acts to control the current in the battery. This dynamometer is shown on an enlarged scale in Figs. 2 and 3. The moving coil $f'$ is mounted on the pivots $f^2$, $f^3$ passing through the stationary coil $f$. The current is led into the moving coil from the conductor 3 by the lead $3^a$ connected to one of the springs $f^4$, thence from the spring to the pivot $f^2$, thence through the moving coil to the other pivot $f^3$, thence through the spring to the fixed coil. The other terminal of the fixed coil is connected to wire $3^b$ in the main alternating current circuit. In the position shown the moving coil is at right angles to the fixed coil, the current in the alternating current generator being assumed to be the average current desired. In this position the current in the circuit 11 passes through the resistances $r$ and $r'$ and none of it passes out through circuit 12 because the potential at the points where $e$ and $e'$ make contact with the segments $c$, $c'$ is the same. If, however, the current increases or decreases the moving coil of the dynamometer will turn on its pivots to one side or other of the central position shown. Thus two positions are indicated in dotted lines, one being a position corresponding to an increase of current in the main generator and the other a position corresponding to a decrease of current in the main generator. Assume that the top of the resistances $r$, $r'$ are connected to the positive side of the circuit, then when the moving coil is in the position with its contact $e'$ bearing against the upper portion of segments $c'$, $d'$, current will pass from conductor 7 of the direct current circuit through conductor 11 and part of the resistance $r'$, thence through segment $c'$, contact $e'$, segment $d'$ to the circuit 12 and booster field $E^2$ to the segment $d$, contact $e$ and through part of the resistance $r$ to the opposite side of the circuit. This will excite the booster in one direction. If the moving coil is in the other position illustrated in Fig. 3, the current will flow in the opposite direction through the booster field winding and excite the booster in the opposite direction. The amount of current passing through the booster field will, therefore, be in proportion to the amount of current from the alternating current circuit passing through the dynamometer and, therefore, the booster E. M. F. will be responsive to the fluctuations of current output of the alternating current generator.

Considering so much of the system as has so far been described, it will be seen that the arrangement permits the battery to effectively act as a compensating influence on generator A to limit the variations of load thereon. Thus if the load on working circuit 4, 5, 6 becomes heavy only a portion of the load will fall on generator A because any increased load on such generator will cause a discharge of the battery to B' and a generation of alternating current in B which will thus supply current to the alternating current working circuit. The position of the dynamometer also causes booster E to compensate for changes of battery condition, because if the battery is above or below normal voltage (for any given current), the load on generator A is affected and therefore the voltage in E is affected.

C represents a direct-current generator connected with the battery D by conductors 9 and 10. 13 and 14 are the conductors of a working circuit containing direct current translating devices. E' is a booster similar to E but placed on the opposite side of the battery—that is, between the battery and generator C and in the line 9. This booster I control by a regulating device F' which is acted upon by variations in the electrical condition of the direct current circuit, and, preferably, by the variations of load on generator C. To this end it is placed in conductor 9 between the generator C and the point at which conductors 9 and 13 connect. As shown this regulator F' is connected into conductor 9 and affects coil $E^3$ of booster E' in precisely the same way as regulator F is connected into conductor 3 and affects coil $E^2$. Further description of F' is therefore unnecessary. By this arrangement battery D acts to steady the loads on both the alternating current and direct current generators. At times boosters E and E' may be acting to cause a discharge from the battery into both working circuits simultaneously. At other times boosters E and E' may be acting to cause a charge to enter the battery both from the rectifying device and the generator C. At still other times the relative loads on the working circuits 4, 5, 6 and 13, 14 may be such that both the prime sources A and C may be simultaneously supplying energy to one or the other of the said working circuits. Indeed it may be that under certain conditions A, C and D will all be simultaneously supplying current to either of said working circuits. It should be noted that this advantage of the system is not limited to a case where one of the working circuits is an alternating current circuit. Thus I have indicated at 15 and 16 another direct current working circuit. Obviously by means of the regulating device F acting upon the booster E, changes of load on the generator A is kept within limits despite any fluctuations in this circuit. It is clear that the same battery D is effective for the purposes set out whether the voltages on opposite sides of battery D are the same or different. Thus if the voltage on circuit 15, 16 is different from that of 13, 14, this can be taken care of merely by the relative design and adjustment of boosters E and E' and their regulating devices. Moreover so far as the two circuits 13, 14 and 15, 16 and the equalization of the loads on generators C and B' are concerned, it is immaterial what the location of the regulating device may be or whether it is in the alternating current side of the system, although it should preferably be between the work circuit and the generator.

It is clear from the foregoing that, while I have shown only a single embodiment of my invention and have specifically described the various parts of said embodiment, my invention is not confined to the specific apparatus shown and described, nor to the employment of all of the elements of the system that I have shown. Thus while I have referred to the regulating devices as acting in accordance with the fluctuations of load on the respective generators, I do not mean to preclude the employment of the generators to feed additional circuits the fluctuations in which are allowed to fall entirely on the generator. For example I have indicated at 75 another alternating current working circuit. Changes in this circuit will not affect the device F or the current in the battery circuit, but in practice such a circuit as 75 would ordinarily be one not subject to violent fluctuations.

Having thus described my invention, what I claim and desire to secure by Letters Patent, is:

1. The combination of alternating and direct current circuits having an appropriate converter operatively connected between them, a battery operatively arranged in respect to the direct-current circuit, and means adapted to cause the battery to charge and discharge and operatively arranged to respond to variations of load on either circuit, substantially as described.

2. The combination of alternating and direct current generators, circuits therefrom having an appropriate converter operatively connected between them, a battery operatively arranged in respect to the direct-current circuit, and means adapted to cause the battery to charge and discharge and operatively arranged to respond to variations of current on each generator.

3. The combination of alternating and direct current circuits having an appropriate converter operatively connected between them, a battery and boosting apparatus operatively arranged with respect to the direct-current circuit, and regulating means for the booster apparatus responsive to variations of the load on either circuit.

4. The combination of alternating and direct current generators, circuits therefrom having an appropriate converter operatively connected between them, a battery and boosting apparatus operatively arranged with respect to the direct current circuit, and regulating means for the booster apparatus responsive to variations of the load on either circuit.

5. The combination of alternating and direct current circuits having an appropriate converter operatively connected between them, a battery operatively arranged in respect to the direct-current circuit, and means adapted to cause the battery to charge and discharge either through the converter or in the direct current circuit and operatively arranged to respond to variations of load on either circuit.

6. The combination of alternating and direct current circuits having an appropriate converter operatively connected between them, a battery operatively arranged in respect to the direct-current circuit, and means adapted to cause the battery to charge and discharge from or to either the alternating current or the direct current side of the system or both according to the variations of electrical condition on the two sides of the system.

7. The combination of alternating and direct current circuits having an appropriate converter operatively connected between them, a battery operatively arranged in respect to the direct-current circuit, and means for varying the battery action and the transfer of energy through the converter responsive to changes of current on each side of the system.

8. The combination of alternating and direct current circuits having an appropriate converter operatively connected between them, a battery operatively arranged in respect to the direct-current circuit, and two independent means for affecting the action of the battery arranged respectively to respond to variations of electrical condition of the two circuits.

9. The combination of alternating and direct current generators, circuits therefrom having an appropriate converter operatively connected between them, a battery operatively arranged in respect to the direct current circuit, and two independent means for affecting the action of the battery arranged respectively to respond to variations of current on the two generators.

10. The combination of alternating and direct current generators, circuits therefrom having an appropriate converter operatively connected between them, a battery operatively arranged in respect to the direct current circuit, and two independent means for affecting the action of the battery and differently determining the course of the battery current, said means being arranged respectively to respond to variations of current on the two generators.

11. The combination of a regulating battery, two independent circuits each connected to the terminals thereof, means for controlling the battery current in accordance with the combined currents of said circuits and for dividing the battery current according to the individual currents of each circuit.

12. The combination of a regulating battery, two generators and a work circuit connected with each of the same, means for controlling the battery current in accordance with the combined current of said generators and for dividing the battery current according to the individual currents of each work circuit.

13. The combination of a regulating battery, two independent work circuits each connected to the terminals thereof, means for enabling said battery to supply energy to either circuit, and means for automatically regulating said battery to supply the proper current and divide its energy between the two circuits according to the relative needs thereof.

14. The combination of an alternating current generator and circuit, a direct current generator and circuit, a rectifying device between them, a storage battery in the direct current circuit, means for affecting the flow of energy through the rectifying device in accordance with the condition of the alternating current generator, and means for affecting the battery current in accordance with the condition of the direct current generator.

15. The combination of an alternating current generator and circuit, a direct current generator and circuit, a rectifying device between them, a storage battery in the direct current circuit, means for affecting the flow of energy through the rectifying device in accordance with the condition of the alternating current circuit, and means for affecting the battery current in accordance with the condition of the direct current circuit.

16. The combination of an alternating current generator, a direct current generator, alternating current and direct current work circuits supplied thereby, a storage battery, and means controlled by current changes of each generator for transmitting energy from the battery to either or both work circuits.

17. The combination of an alternating current generator, a direct current generator, alternating current and direct current work circuits, a storage battery, and means controlled by current changes of each generator for charging said battery from either or both generators.

18. The combination of an alternating current generator, a direct current generator, alternating current and direct current work circuits, a storage battery, and means controlled by current changes of each generator for transmitting energy from the battery to either or both work circuits and for charging said battery from either or both generators.

19. The combination of an alternating current generator, a direct current generator, alternating current and direct current work circuits, a storage battery, and means for automatically transmitting energy from the battery to either or both circuits or charging the battery from either or both generators to the conditions on the two sides of the system.

20. The combination of an alternating current generator, a direct current generator, alternating current and direct current work circuits, a storage battery, and means for automatically transmitting energy from the battery to either or both circuits or charging the battery from either or both generators according to the current strengths of the two generators.

21. The combination of an alternating current circuit, a direct current circuit, a rectifying device between them, a battery in the direct current circuit, means for varying the ratio between the electro-motive force impressed upon the direct current end of the rectifying device and the electro-motive force generated thereby in accordance with the condition of the alternating current circuit, a battery booster, and means for varying the electro-motive force thereof in accordance with the condition of the direct current circuit.

22. The combination of an alternating current generator, a direct current generator, a rectifying device between them, a battery in the direct current circuit, means for varying the ratio between the electro-motive force impressed upon the direct current end of the rectifying device and the electro-motive force generated thereby in accordance with the current of the alternating current generator, a battery booster and means for varying the electro-motive force thereof in accordance with the current of the direct current generator.

23. The combination of an alternating current generator and work circuit, a direct current generator and work circuit, a rectifying device between them, a battery in the direct current circuit, means for varying the ratio between the electro-motive force impressed upon the direct current end of the rectifying device and the electro-motive force generated thereby in accordance with the current of the alternating current generator, a battery booster, and means for varying the electro-motive force thereof in accordance with the current of the direct current generator.

24. The combination of an alternating current generator, a work circuit, a direct current work circuit, means for operatively connecting the battery with the first named circuit, an independent branch connecting the battery with said direct current circuit, a booster therein, means for varying the flow of energy from the battery to the first named circuit responsive to current changes of the alternating current generator, and means for varying the booster electro-motive force to compensate for changes of battery electro-motive force thus caused.

25. The combination of an alternating current generator, a direct current generator, a storage battery, an alternating current work circuit and means for supplying the energy to said work circuit from the alternating current generator alone or in conjunction with either or both of the other two sources of supply.

26. The combination of an alternating current generator, a direct current generator, a storage battery, a direct current work circuit and means for supplying the energy to said work circuit from the direct current generator alone or with either or both of the other two sources of supply.

27. The combination of an alternating current generator, a direct current generator, a storage battery, an alternating current work circuit and means for supplying the energy to said work circuit from the alternating current generator alone or with either or both of the other two sources of supply and for charging the battery from either or both generators.

28. The combination of an alternating current generator, a direct current generator, a storage battery, a direct current work circuit and means for supplying the energy to said work circuit from the direct current generator alone or with either or both of the other two sources of supply and for charging the battery from either or both generators.

29. The combination of an alternating current generator, a direct current generator, a storage battery connected thereto, an alternating current work circuit connected to the alternating current generator and means controlled by electroresponsive devices in the circuits of the two generators for causing the energy to said work circuit to be supplied either from the alternating current generator alone or with either or both of the other two sources of supply.

30. The combination of an alternating current generator, a direct current generator, a storage battery connected thereto, an alternating current work circuit connected to the alternating current generator and means controlled by electroresponsive devices in the circuits of the two generators for causing the energy to said work circuit to be supplied either from the alternating current generator alone or with either or both of the other two sources of supply and for charging the battery from either or both generators.

31. The combination of an alternating current generator, a direct current generator, a storage battery, an alternating current work circuit, a direct current work circuit, and means for causing the energy to each work circuit to be supplied either from its appropriate generator alone or with either or both of the other two sources of supply.

32. The combination of an alternating current generator, a direct current generator, a storage battery, an alternating current work circuit and a direct current work circuit connected to their respective generators, and means controlled by electroresponsive devices in the circuits of the two generators for causing the energy to each work circuit to be supplied either from its appropriate generator alone or with either or both of the other two sources of supply.

33. The combination of an alternating current generator, a direct current generator, a storage battery, an alternating current work circuit and a direct current work circuit connected to the respective generators, and means controlled by electroresponsive devices in the circuits of the two generators causing the energy to each work circuit to be supplied either from its appropriate generator alone or with either or both of the other two sources of supply and for charging the battery from either or both generators.

34. The combination of an alternating current generator, a direct current generator, alternating current and direct current work circuits, a rectifying device and electroresponsive devices in the alternating current and direct current circuits acting to vary the energy through the rectifying device to cause each generator to act as a compensating influence upon the other.

35. The combination of two electric generators, a storage battery connected in parallel with and between said generators, and means for regulating the battery condition in accordance with the variations of current from each of said generators.

36. The combination of two electric generators, a storage battery connected in parallel with and between said generators, two boosters, one between the battery and each generator, and means for regulating the electromotive force of each booster in accordance with changes of current from the corresponding generator.

37. The combination of two electric generators, a storage battery connected in parallel with and between said generators, a work circuit connected between the battery and one of the generators, and means for regulating the battery condition in accordance with the variations of current from each of said generators.

38. The combination of two electric generators, a storage battery connected in parallel with and between said generators, two work circuits, one connected between each generator and the battery, and means for regulating the battery condition in accordance with the variation of current from each of said generators.

39. The combination of two electric generators, a storage battery connected in parallel with and between said generators, two boosters, one between the battery and each generator, a work circuit connected between the battery and one of the generators, and means for regulating the electro-motive force of each booster in accordance with changes of current from the corresponding generator.

40. The combination of two electric generators, a storage battery connected in parallel with and between said generators, two boosters, one between the battery and each generator, two work circuits, one connected between each generator and the battery, and means for regulating the electro-motive force of each booster in accordance with changes of current from the corresponding generator.

41. The combination in an electrical system of distribution, of an electric generator and a working circuit connected thereto, a second generator and a second working circuit connected thereto, a storage battery connected between and in parallel with both generators with respect to their working circuits, and two independent means for regulating the battery in accordance with the needs of the system at each side of the battery.

42. A system of distribution, two electric generators feeding the same, a storage-battery circuit connected across the system between the said generators, two working circuits connected to the system at opposite sides of the battery connection, and two devices for regulating the battery condition, each acted upon by current from one of the two generators.

43. An alternating current circuit and a generator feeding the same, a direct current circuit and a generator feeding the same, a rectifying device between the two circuits, a work circuit connected to said alternating circuit, another work circuit connected to the direct current circuit, a storage-battery connected across the system between the direct current work circuit connections and the rectifying device, and two devices for regulating the battery condition, one being acted upon by current from the alternating current circuit and the other by current from the direct current circuit.

44. An alternating current circuit and a generator feeding the same, a direct current circuit and a generator feeding the same, a rectifying device between the two circuits, a work circuit connected to said alternating circuit, another work-circuit connected to the direct current circuit between the rectifying device and the direct current generator, a storage battery connected across the system between the direct current work circuit connections and the rectifying device, and two devices for regulating the battery condition, one being acted upon by current from the alternating current circuit and the other by current from the direct current circuit.

45. An alternating current circuit and a generator feeding the same, a direct current circuit and a generator feeding the same, a rectifying device between the two circuits, a work circuit connected to said alternating circuit, another work circuit connected to the direct current circuit, a storage battery connected across the system between the direct current work circuit connections and the rectifying device, and two devices for regulating the battery condition one being responsive to load changes on the alternating current generator and the other to load changes on the direct current generator.

46. An alternating current circuit and a generator feeding the same, a direct current circuit and a generator feeding the same, a rectifying device between the two circuits, a storage battery connected across the direct current circuit and located between the generator and the rectifying device, a work-circuit connected to the alternating current circuit, a work circuit connected to the direct current circuit and between the generator and the battery, and two devices for regulating the battery condition, one of which is responsive to load changes on the alternating current generator and the other to load changes on the direct current generator.

47. An alternating current circuit and a generator feeding the same, a direct current circuit and a generator feeding the same, a rectifying device between the two circuits, a storage battery connected across the direct current circuit and located between the generator and the rectifying device, a work-circuit connected to the alternating current circuit, a work circuit connected to the direct current circuit and between the generator and the battery, a booster between the battery and the rectifying device, a device for regulating the electro-motive force of said booster acted upon by current from the alternating current circuit, another booster between the battery and the direct current work circuit, and a device for regulating the electro-motive force of the latter booster acted upon by current from the direct current circuit.

48. An alternating current circuit and a generator feeding the same, a direct current circuit and a generator feeding the same, a rectifying device between the two circuits, a storage battery connected across the direct current circuit and located between the generator and the rectifying device, a work-circuit connected to the alternating current circuit, a work circuit connected to the direct current circuit and between the generator and the battery, a booster between the battery and the rectifying device, a device for regulating the electro-motive force of said booster responsive to load fluctuations on the alternating current generator, another booster between the battery and the direct current work circuit, and a device for regulating the electro-motive force of the latter booster responsive to load fluctuations on the direct current generator.

49. A system of distribution, two electrical generators feeding the same, a storage battery circuit connected across the system between the said generators, two work circuits connected to the system at opposite sides of the battery connection, two boosters, one between the battery and each work circuit, and a device for regulating the electromotive force of each booster, the two devices being respectively responsive to changes of the electrical condition of the system at opposite sides of the battery.

50. A system of distribution, two electrical generators feeding the same, a storage battery circuit connected across the system between the said generators, two work circuits connected to the system at opposite sides of the battery connection, two boosters, one between the battery and each work circuit, and a device for regulating the electromotive force of each booster, the two devices being respectively responsive to the fluctuations of load on the two generators.

51. The combination of an alternating current generator and circuit, a direct current generator and circuit, a rectifying device connecting the alternating current and direct current circuits, a storage battery, and independent means for controlling the compensating action of the battery upon each generator responsively to changes in the electrical condition of said generator.

52. The combination of an alternating current generator and circuit, a direct current generator and circuit, a rectifying device connecting the alternating current and direct current circuits, a storage battery, a booster between the battery and the direct current circuit, means for controlling said booster responsively to changes of electrical condition of the direct current generator, and independent means for regulating the compensating action of the battery upon the alternating current generator controlled responsively to changes of electrical condition of the alternating current generator.

53. An alternating current generator, a direct current generator, a rectifying device between them, a storage battery, a booster between the battery and the alternating current generator, another booster between the battery and the direct current generator, and means for independently controlling said boosters.

54. An alternating current generator, a direct current generator, a rectifying device between them, a storage battery, a booster between the battery and the alternating current generator, another booster between the battery and the direct current generator, and means for automatically controlling said boosters in accordance with changes of electrical condition of the alternating current and direct current generators respectively.

55. An alternating current generator, a direct current generator, a rectifying device between them, a storage battery, a booster between the battery and the rectifying device, another booster between the battery and the direct current generator, and means for independently controlling said boosters.

56. An alternating current generator, a direct current generator, a rectifying device between them, a storage battery, a booster between the battery and the rectifying device, another booster between the battery and the direct current generator, and means for automatically controlling said boosters in accordance with changes of electrical condition of the alternating current, and direct current generators respectively.

57. The combination of two direct current generators, a storage battery connected in parallel with and between said generators, two direct current work circuits, one connected between each generator and the battery, and means for dividing a battery load or charge between the two work circuits or between the two generators.

58. The combination of two direct current generators, a storage battery connected in parallel with and between said generators and two direct current work circuits, one connected between each generator and the battery, and means for dividing a battery load or charge between the two work circuits or between the two generators, said means being responsive to variations of current strength of the respective generators.

59. The combination of an alternating current generator, a battery, a rectifying device, two alternating current work circuits between the generator and rectifying device, an electro-responsive device responsive to the current flow in the circuit between said work circuits, and means for causing said electro-responsive device to vary the battery action.

60. An alternating current generator and work circuit, a direct current generator and work circuit, and a battery connected and arranged to receive or transmit energy to or from either or both sides of the system.

61. An alternating current generator and work circuit, a direct current generator and work circuit, a battery connected and arranged to receive or transmit energy to or from either or both sides of the system, and means for controlling said battery action responsively to the current changes on each generator.

62. A system of distribution comprising the combination of a direct current circuit having a battery and complemental booster to compensate for fluctuations on the direct current circuit, an alternating current circuit, transformer provisions between the two circuits and a booster in series with the direct current and of the transformer provisions, and a current regulator responsive to fluctuations on the alternating current circuit and arranged to control the field of the last named booster to effect the transfer of energy between the two circuits in accordance with said alternating current fluctuations, substantially as described.

63. A system of distribution comprising a direct current circuit and its battery and complemental booster to compensate for fluctuations on the direct current circuit, an alternating current circuit, transformer provisions between the two circuits, and means responsive to fluctuations of the alternating current circuit to compel the transfer of energy between the two circuits in accordance with such alternating current fluctuations, substantially as described.

In testimony whereof, I have signed my name to this specification, in the presence of two subscribing witnesses.

WALTER E. WINSHIP.

Witnesses:
EDWIN SEGER,
JOHN O. GEMPLER.